MAGNETIC SOUND RECORDING OR REPRODUCING APPARATUS

Filed March 6, 1951

Inventor
GILBERT FARADAY DUTTON
NORMAN HAROLD GAWTHROP
By Ralph E. Atherton
Attorney United States Patent Office 2,737,395

Patented Mar. 6, 1956

2,737,395

MAGNETIC SOUND RECORDING OR REPRODUCING APPARATUS

Gilbert Faraday Dutton, Iver Heath, and Norman Harold Gawthrop, Hayes, England, assignors to Electric & Musical Industries Limited, Hayes, England, a British company Application March 6, 1951, Serial No. 214,046

Claims priority, application Great Britain March 8, 1950

5 Claims. (Cl. 274—4)

Figures 1, 2:
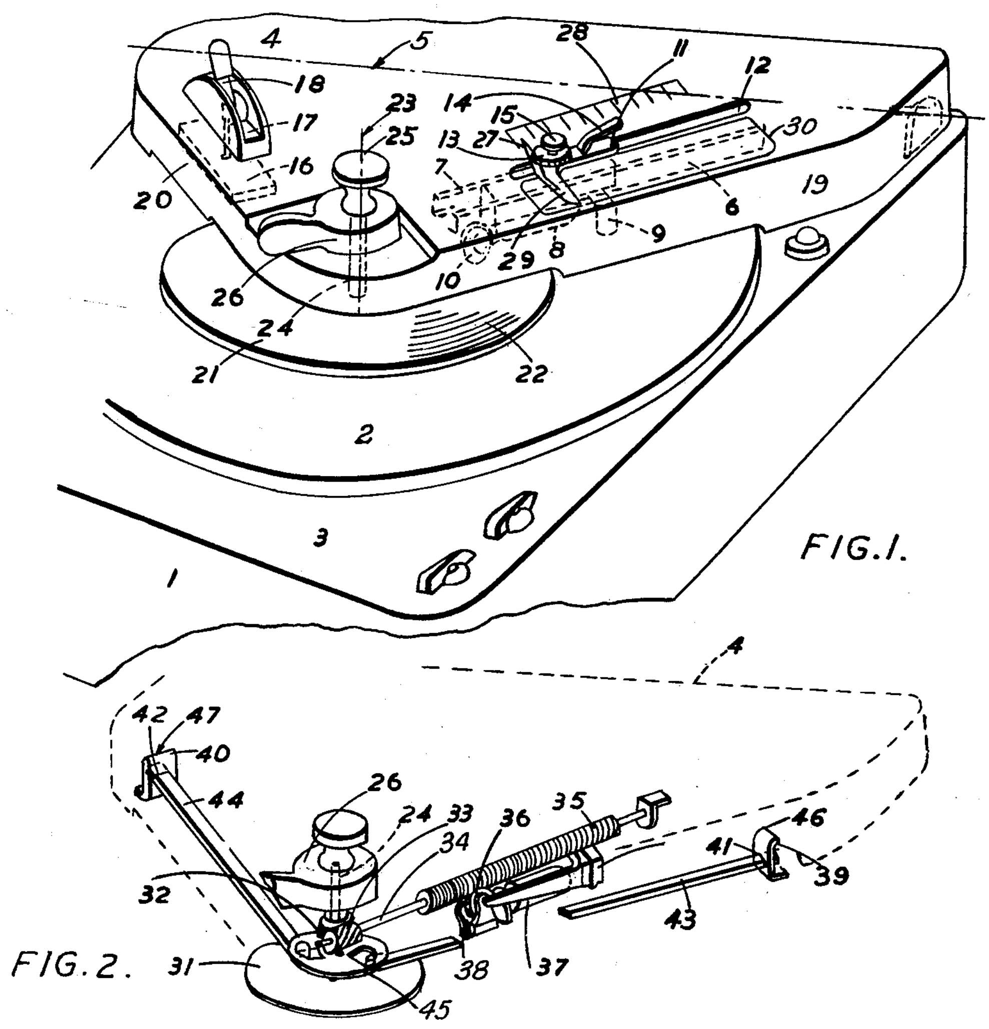

This invention relates to magnetic sound recording or reproducing apparatus.

In the United States Patent No. 2,690,340, filed September 20, 1950, by H. M. Harrison and J. W. Driscoll, there is described, with reference to Figures 1 to 4 of the drawings, magnetic recording and reproducing apparatus which comprises a casing on which is mounted a turntable for supporting a magnetic record disc. An arm pivoted to the casing carries a tracking disc formed with a spiral tracking groove and has guides in which a carriage is supported for movement along the arm. The carriage in turn supports an electro-magnetic transducing head and a tracking wheel adapted to engage the tracking disc. The arm can be pivoted from a raised position, in which the tracking disc and carriage are supported above the turntable to allow a record disc to be placed thereon, to an operative or lowered position in which the tracking disc is in driven engagement with the turntable whilst the transducing head rests on the record disc. When the turntable is then rotated, the resultant rotation of the tracking and record discs causes the transducing head to be tracked relatively to the record disc in known manner due to the engagement of the tracking wheel with the tracking disc. Moreover, the aforesaid arm is so pivoted and is of such length that, when lowered to the operative position, it extends diametrically across the turntable in the manner of a bridge and an erasing device is supported on the arm at the other side of its centre from the transducing head. This arrangement of the principal external operating parts of the apparatus on a single pivoted support is a desirable feature but the provision of an arm of a sufficient length to extend wholly across the turntable leads to difficulties of construction on account of the considerable length of the arm and its moment about the pivot and also detracts from the appearance of the apparatus.

An object of the present invention is to reduce such difficulties.

Another object of the present invention is to provide magnetic sound recording or reproducing apparatus comprising a base, a turntable mounted for rotation on said base, a support pivoted to said base about an axis in or parallel to the plane of the turntable, and an electromagnetic transducing head and a magnetic erasing device mounted on said support, said head being mounted for movement along a path which defines one side of a triangle which is based on said axis and has a third side intersecting said erasing device.

In one form of the invention a tracking disc formed with a spiral groove is mounted on the support for rotation about an axis normal to the plane of the triangle and passing through the apex thereof and the transducing head is connected for movement with a tracking member which is adapted to engage the groove of said tracking disc. In another form of the invention a clutch member adapted to make driven engagement with the turntable, or the turntable spindle, is mounted on the support for rotation about an axis normal to the plane of said triangle and passing through the apex thereof, and lead screw mechanism is provided on said support in driving connection with said clutch member and adapted to track the transducing head along said path.

Figure 3:
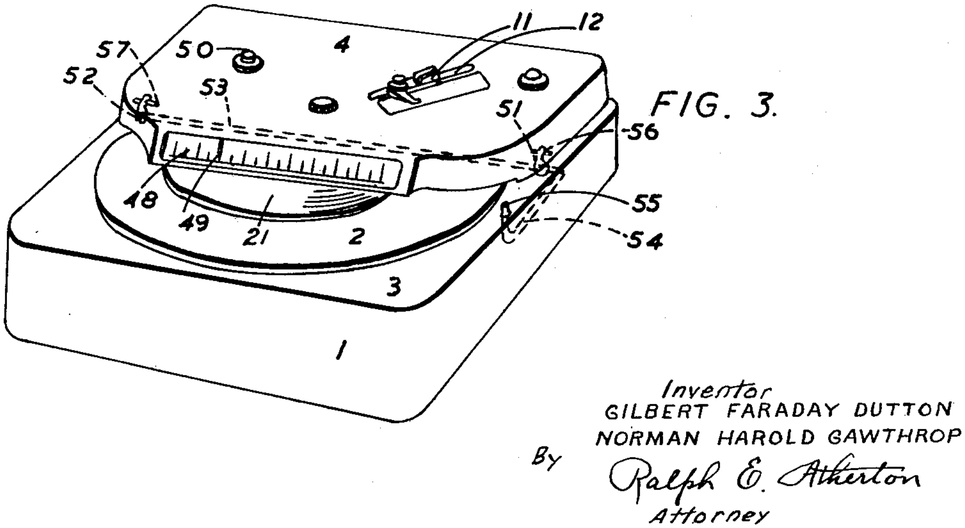

In order that the said invention may be celarly understood and readily carried into effect, the same will now be more fully described with reference to the accompanying drawings, in which:

Figure 1 illustrates in perspective view magnetic recording and transducing apparatus according to one example of the present invention, and Figures 2 and 3 illustrate modifications of Figure 1.

Referring to Figure 1 of the drawings, the apparatus illustrated comprises a cabinet 1 having a turntable 2 mounted for rotation on the top panel or motor-board 3 of the cabinet 1. A tracking plate 4 is pivoted to the motor-board 3 by means of suitable hinges (not shown) about an axis which is indicated by the dot and dash line 5, this axis being disposed in the plane of the top surface of the turntable 2. The tracking plate 4 is of substantially triangular shape in plan view, and is dished to provide a rear wall parallel to the axis 5 and two sides 19 and 20 enclosing substantially a right angle at the front or apex of the tracking plate. The rear wall extends from side to side of the motor board 3 and has a length greater than the diameter of the turntable 2. The parallel guide rails 6 and 7, extending parallel to the side 19 as indicated, are secured to the underside of the tracking plate, and a carriage 8 which supports an electro-magnetic transducing head 9, and a tracking wheel 10 is supported by means of the guide rails 6 and 7 for longitudinal movement. For simplicity of illustration only a dotted outline of the carriage 8, the transducing head 9 and the tracking wheel 10 is shown since the construction of these parts is substantially the same as described with reference to Figures 1 to 4 of the specification of the aforesaid application. A part 11 of the carriage extends to the upper surface of the tracking plate 4 through a slot 12 and a knob 13, finger plate 14 and press stud 15, are mounted above the part 11. The parts 13, 14 and 15 correspond respectively to the parts denoted by the references 117, 118 and 128 in the specification of the aforesaid application.

The erasing device comprising a permanent magnet 16 is also mounted on the underside of the tracking plate 4. The magnet is suspended by means of a link 17 from a lever 18 which projects above the upper surface of the tracking plate 4 so that by manipulating the lever the magnet can be lowered to the turntable or raised therefrom. The structural details of the erasing device will not be further described since they are the same as described with reference to Figures 1 to 4 of the specification of the aforesaid application. The width of the magnet 16 is greater than its length and it is mounted on the tracking plate 4 so that its medial plane is parallel to the side 20 of the tracking plate.

A coupling member in the form of a tracking disc 21 formed in known manner with a spiral tracking groove 22 is supported by the tracking plate 4 so that it is freely rotatable about an axis denoted by the dot and dash line 23 which is normal to the plane of the tracking disc 4 and passes through the apex of a triangle which is based on the axis 5, and has its other two sides defined by the path of the carriage 8 (as determined by the guide rails 6 and 7) and by the medial plane of the magnet 16. The tracking line of the head 9 is therefore radial with respect to the disc 21 and lies between the axis 23 and the axis 5. The tracking disc is secured to a spindle 24 which has a knob 25 at its upper end to enable the angular position of the tracking disc to be adjusted, and a further knob 26 is mounted on the spindle 24 so as to be free to rotate relative to the tracking disc 21, the knob 26 serving to release automatic locking means for the tracking plate 4 which will be described in more detail with reference to Figure 2. Normally the tracking wheel 10 engages the spiral groove 22 and functions as a follower member but can be released therefrom by depressing the finger plate 14, as described in the aforesaid application so that the head 9 can be moved independently of the tracking disc 21. Depression of the finger plate 14 may also lift the transducing head from the turntable, but preferably the head is not so lifted because it is an advantage to the operator when searching for a position on the record to be able to release the tracking wheel only, leaving the transducing head independently in contact with the record. As also described in the aforesaid specification, the knob 13 allows the distance between the transducing head 9 and the tracking wheel 10 to be adjusted while manipulation of the press stud 15 effects back spacing of the carriage 8. An indicator 27 is secured to the part 11 of the carriage and co-operates with a time scale 28 on the upper surface of the plate 4. A cueing pointer 29 is also secured to the part 11 of the carriage 8 and is adapted to co-operate with a cueing pad 30 secured to the top surface of the tracking plate 4.

The tracking plate 4 is shown in Figure 1 in its operative position in which it is automatically locked by the locking means aforesaid. In this position of the tracking plate 4, the tracking disc 21 rests on the turntable 2, or a record disc thereon, so that the axis 23 is co-axial with the turntable axis. Moreover, the transducing head 9 rests on the outer part of the turntable, which is not covered by the tracking disc. Rubber friction pads (not shown) are provided on the upper surface of the turntable and on the undersurface of the tracking disc 21 as described in the specification of the aforesaid application so that on rotation of the turntable the tracking disc is also rotated and thereby couples the transducing head 9 with the turntable, causing the transducing head to be tracked in a radial path from the outer edge of the turntable to the outer edge of the tracking disc, due to the engagement between the tracking wheel 10 and the groove 22. The operational details of the apparatus are, however, the same as those of the apparatus described in the specification of the aforesaid application and will not be further referred to herein. By manually rotating the knob 26 to the right, the locking means for the tracking plate 4 are released and the tracking plate automatically pivots upwardly about the axis 5 due to the action of springs (which are not shown) and consequently lifts the tracking disc 21 and with it the other parts mounted on the plate 4 to an inoperative position above the turntable. A record disc can then be removed from or replaced on the turntable as required.

The tracking plate 4 may be in the form of a relatively thin light-weight cover secured to a framework made as a pressing or die-casting.

In the modification of the invention which is illustrated in Figure 2, the coupling member, instead of being in the form of the tracking disc 21 consists of a clutch member 31 which may have on its undersurface friction pads in the same manner as the tracking disc 21 so that when it is lowered to the operative position frictional drive is transmitted to it from the turntable 2. Alternatively the member 31 may be formed on its undersurface with one element of a dog clutch, the other element of which is carried by the turntable spindle, engagement of the two elements automatically occurring when the plate 4 is lowered to the operative position. A skew-gear 32 is fast on the spindle 24 of the clutch member 31 and engages a further skew-gear 33 on the shaft 34 of a lead screw 35. The carriage (not shown) for the transducing head 9 in this modification carries a throated worm wheel 36 to function as the follower member, instead of the tracking wheel 10 of Figure 1, and this worm wheel 36 is normally spring loaded into engagement with the lead screw 35 and is held against rotation by a holding pawl not shown, but the pawl can be released by the finger plate 14, as described with reference to the tracking wheel 10 of Figure 1, to allow movement of the transducing head independently of the lead screw. In this form of apparatus when the tracking plate 4 (shown merely by dotted lines) is in the operative position and the turntable 2 is rotated, the rotation of the clutch member 31 drives the lead screw 35 in such a direction that the transducing head is tracked relatively to the turntable in the required manner, the carriage supporting the transducing head 9 and the wheel 36 being omitted for convenience of illustration. Moreover, in this modification back spacing, instead of being effected as in Figure 1 by the press stud 15, is effected by means of an electro-magnet 37 which operates a pawl 38 so that back spacing can be effected by means of a remotely located switch which controls the current supplied to the electro-magnet 37.

The locking means for the tracking plate 4 embodied in the apparatus illustrated in Figure 1 is also embodied in the modification of Figure 2 and as shown in the latter figure comprises two brackets 39 and 40 attached to the motor-board 3 of the cabinet 1. The brackets have slots 41 and 42 adapted to receive the outer ends of latching rods 43 and 44 whose inner ends engage a locking cam 45 which is freely rotatable on the spindle 24 but is connected for rotation with the lock release knob 26. The cam 45 is spring loaded so that when the tracking plate is in its operative position the latching rods 43 and 44 project through the slots 41 and 42 in the brackets 39 and 40. In this position of the cam plate the knob 26 occupies the left-hand position shown in Figure 1, and on turning the knob 26 to the right the cam 45 withdraws latching rods 43 and 44 from the slots 41 and 42 and allows the loading springs for the tracking plate 4 to raise the latter into the inoperative position. The loading spring for the cam 45 automatically returns the latching rods to the locking position as soon as the knob 26 is released. On again lowering the tracking plate 4 to the operative position the latching rods 43 and 44 ride on bevelled edges 46 and 47 and the brackets 39 and 40 until the latching rods automatically spring into the slots 41 and 42 and thereby locking the plate 4 in the operative position.

In the modification illustrated in Figure 3, the tracking plate 4 instead of being of triangular shape is of substantially rectangular shape and a time scale 48 is provided along the front edge of the cover. In this modification of the invention the tracking disc 21 is carried by the tracking plate 4 as in Figure 1 and the carriage for the transducing head (not shown) is therefore of the same construction as in Figure 1. A separate indicator 49, is, however, provided movable in front of the time scale 48 and this is connected for movement with the carriage of the transducing head in any suitable manner, for example by means of a tensioned cord. Moreover, instead of providing an erasing device which comprises a permanent magnet, the erasing device is in the form of an electro-magnet adapted to be energised with alternating current when it is desired to effect erasure. The erasing device is not actually shown but numeral 50 denotes a press button switch which controls the application of alternating current to the electro-magnet. When the switch is depressed to supply current, it also causes the turntable 2 to be rotated by at least one revolution so that the entire area of any record on the turntable is erased. The locking means of the apparatus illustrated in Figure 3 comprises two latches 51 and 52 projecting through the motor-board 3 and mounted on a shaft 53 which extends across the apparatus on the underside of the motor-board. A lever 54 is secured to one end of the shaft 53 and is provided at its forward end as shown with a press stud 55. Pins 56 and 57 are provided underneath the tracking plate 4 so positioned that when the tracking plate 4 is in its operative position they can be engaged by the latches 51 and 52 and the latches are spring loaded in any suitable manner to effect such engagement automatically. Release of the latches for the purpose of raising the tracking plate 4 to the inoperative position can be effected merely by depressing the press stud 55.

The apparatus which is illustrated in Figure 3 may be further modified by replacement of the tracking disc 21 and the associated tracking mechanism by the tracking mechanism illustrated in Figure 2. Furthermore where the tracking plate 4 is of substantially rectangular form the lead screw (if such is employed) may be disposed with its axis parallel to the front edge of the tracking plate, that is behind the time scale 48. In this case the tracking wheel, that is the worm wheel 36, could be mounted separately from the transducing head 9 and connected therewith in any suitable manner, as by means of a flexible wire any lost motion in which is taken up by means of a spiral spring, as is commonly used for tracking the pointers of turning scales in radio receivers.

Other modifications may also be made to the invention; for example the tracking may be effected by means of a lead screw disposed to the rear of the tracking plate 4 so as to be coaxial with the axis of pivotation or parallel thereto. In this case the lead screw may be driven from the driving motor for the turntable directly by means of suitable gearing, and the movemetn of the tracking member engaging the lead screw transmitted by means of a tensioned wire as indicated above.

Apart from the constructional advantages which are obtained by the use of the tracking plate such as described with reference to Figures 1 to 3 there is the advantage that it lends itself to clean and pleasing styling and also protects the external operating parts from damage and dust. The employment of a lead screw for effecting the tracking has the additional advantage that a larger area of a record placed on the turntable can be used for receiving a record.

What we claim is:

1. Magnetic sound recording or reproducing apparatus comprising a base, a turntable mounted for rotation on said base, a support pivoted to the said base about an axis normal to a plane containing the axis of said turntable, and an electromagnetic transducing head and a magnetic erasing device mounted on said support, said head being mounted for movement along a path defining one side of a triangle based on said first axis and having its third side intersecting said erasing device and enclosing substantially a right-angle with said first-mentioned side.

2. Magnetic sound recording or reproducing apparatus comprising a base, a turntable mounted for rotation on said base, a support pivoted to said base about an axis normal to a plane containing the axis of said turntable, a rotatable coupling member mounted on said support, said support being arranged for pivotation about said first axis between an elevated position and a lower position in which said coupling member is co-operative with said turntable for rotation coaxially therewith, an electromagnetic transducing head mounted on said support, a magnetic erasing device mounted on said support, said head being mounted for movement along a path defining one side of a triangle based on said first axis with its apex on the axis of rotation of said coupling member and its third side intersecting said erasing device and enclosing substantially a right-angle with said first-mentioned side, and means connecting said head with said coupling member for displacement of said head along said path on rotation of said coupling member.

3. Apparatus according to claim 2, said coupling member comprising a tracking disc with a spiral groove, and said last-mentioned means comprising a follower arranged to engage the groove of said tracking disc.

4. Apparatus according to claim 2, said coupling member comprising a clutch element, and said last-mentioned means comprising a lead screw in driven connection with said clutch element and a follower member engaging said lead screw and connected to said transducing head.

5. Magnetic sound apparatus comprising a base, a turntable mounted for rotation on said base, a support, a rotatable tracking disc mounted on said support, said support being pivoted to said base for movement between a lowered position in which said tracking disc is coaxial with and rotationally coupled with said turntable, and a raised position allowing a record to be placed on or removed from said turntable, and said support having one side with at least as great an extent as the diameter of said turntable with the pivotal axis of the support extending along that side, an electromagnetic transducing head mounted on said support, a magnetic erasing device mounted on said support, said transducing head being mounted for movement along a line which is radial with respect to the axis of said tracking disc and defines one side of a triangle based on said pivotal axis and having its third side intersecting said erasing device, and means for causing tracking movement of said head along said line in response to rotation of said tracking disc.

References Cited in the file of this patent

UNITED STATES PATENTS

| | | |
|---|---|---|
| 423,795 | Morris | Mar. 18, 1890 |
| 898,283 | Stuart | Sept. 8, 1908 |
| 1,533,561 | Lindner | Apr. 14, 1925 |
| 2,166,986 | Dally | July 25, 1939 |
| 2,219,230 | Krause | Oct. 22, 1940 |
| 2,463,513 | Brubaker | Mar. 8, 1949 |
| 2,532,803 | Faus | Dec. 5, 1950 |
| 2,535,495 | James | Dec. 26, 1950 |
| 2,567,092 | Williams | Sept. 4, 1951 |
| 2,589,035 | Begun | Mar. 11, 1952 |
| 2,690,340 | Harrison et al. | Sept. 28, 1954 |